Figure 1:
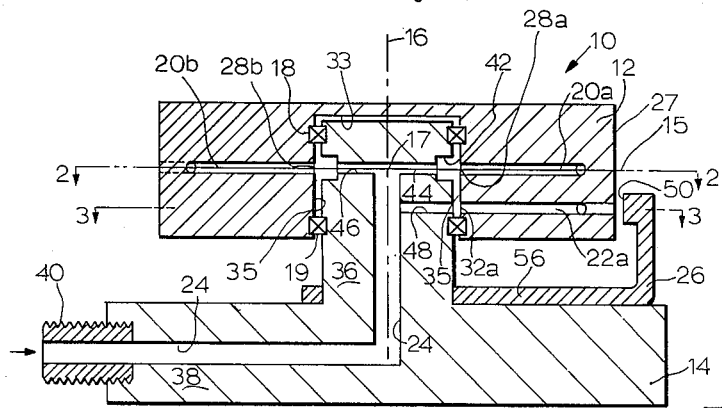

March 29, 1966     F. SAMET     3,242,743

ROTOR SPEED CONTROL

Filed May 26, 1964

FRANK SAMET
INVENTOR.

BY

Thomas W. Kennedy
ATTORNEY

United States Patent Office 3,242,743
Patented Mar. 29, 1966

3,242,743
ROTOR SPEED CONTROL
Frank Samet, New York, N.Y., assignor to General Precision, Inc., Little Falls, N.J., a corporation of Delaware
Filed May 26, 1964, Ser. No. 370,255
12 Claims. (Cl. 74—5.7)

The present invention relates to a gas-driven rotor and more particularly to a gas-driven rotor having a speed control apparatus to provide constant angular speed and momentum.

In general, speed control apparatus on a gas-driven rotor frequently requires elaborate auxiliary equipment such as separate speed sensors and flow control valves which result in a device which is not conveniently usable in gyroscopes and other high precision devices. A speed control apparatus for a gas-driven rotor is desirable which eliminates the need for such auxiliary equipment, and at the same time provides a precise control over the rotor speed.

The present invention provides a rotor unit of this type, which in its preferred form comprises a rotor journaled on a shaft. The rotor has at least one accelerating or drive jet nozzle, with a continuous flow discharge. The rotor also has at least one decelerating or braking jet nozzle. The decelerating jet nozzle has a passage with an inlet at its radially-inner end receiving a high-pressure intake charge momentarily within a prescribed travel arc in each revolution of the rotor. The decelerating nozzle, which has an outlet orifice at its radially-outer end, exhausts such charge. The shaft supports a shutter means which obstructs momentarily the outlet orifice of the decelerating jet nozzle, and varies the orifice discharge in proportion to the relative speed between the rotor and shaft.

Accordingly, it is one object of the present invention to provide an apparatus for maintaining constant angular speed and momentum in a gas-driven rotor by using automatically controlled, decelerating jet nozzles.

Still another object is to provide a rotor having a continuous-flow, pneumatic drive jet means and a separate intermittent-flow pneumatic brake jet means, which has control means to maintain the angular speed of said rotor within a narrow range.

A further object of the present invention is the provision of an adjustable speed control apparatus for a gas-driven rotor, which can be adjusted to operate the rotor at any one said average speed within a wide range of speeds, said speed varying very slightly within a narrow range, relative to said wider range of speeds.

A still further object of the invention is the provision of a gas-driven rotor for use in a gyroscope, and similar high precision devices.

To the fulfillment of these and other objects, the invention provides a gas-driven rotor unit comprising a rotor co-axially mounted upon a shaft for rotation relative thereto. The rotor has at least one drive jet having a radially-outer nozzle portion discharging in a substantially tangential direction. Said rotor also has at least one braking jet with a radially outer nozzle portion pointed and discharging in a generally opposite tangential direction to said drive jet. Said braking jet also has a flow control which varies the discharge from the braking jet nozzle in proportion to the speed of the rotor for providing a substantially constant rotor speed.

Figure 2:
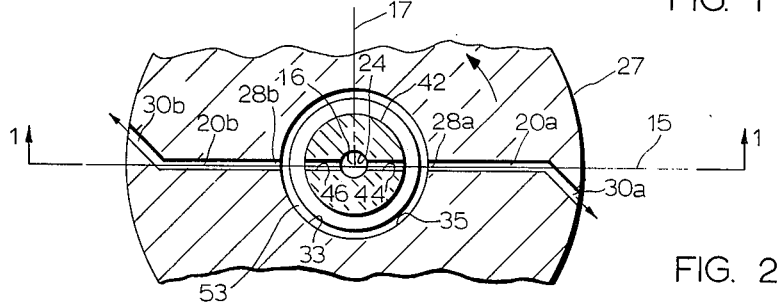
Figure 3:
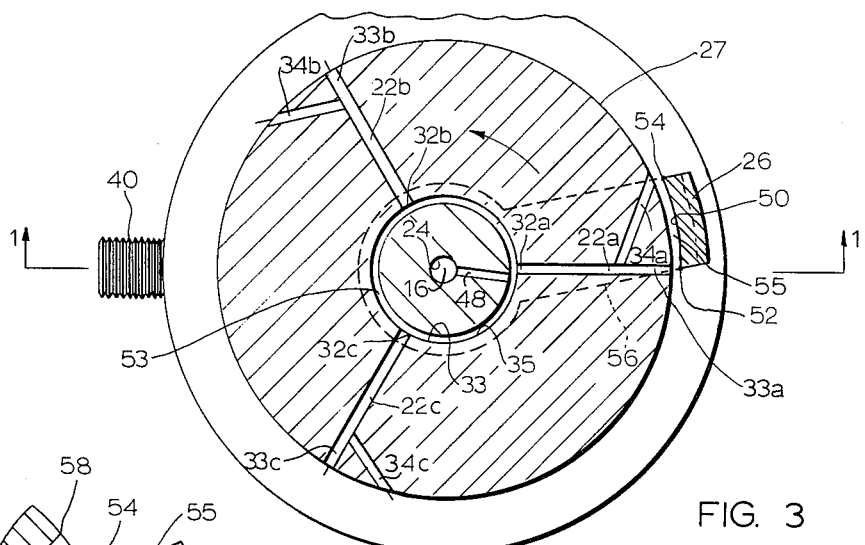
Figure 4:
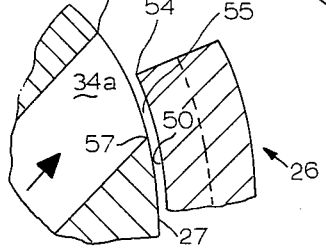

Other objects of the invention will become apparent upon reading the annexed detail description in accordance with the drawings wherein like parts are designated by like numerals throughout the several views, and wherein:

FIG. 1 is a sectional view of a rotor unit embodying features of the present invention;
FIG. 2 is a sectional view as taken on line 2—2 of FIG. 1;
FIG. 3 is a sectional view as taken on line 3—3 of FIG. 1; and
FIG. 4 is an enlarged detail of a portion of FIG. 3.

Referring to FIG. 1, one embodiment of the present invention is a rotor unit 10 comprising a rotor 12 journaled on a shaft or a hub portion 36 of a stator 14 for rotation relative thereto. Rotor 12 has two drive jets 20a, 20b supplied with high-pressure gas for torquing and accelerating rotor 12; and has three braking jets 22a, 22b, 22c supplied with high-pressure gas for counter-torquing and decelerating rotor 12. Shaft 36 supports a shutter plate or jet vane 26 controlling the discharge flow from the braking jets 22a, 22b, 22c for maintaining a substantially constant rotor speed.

Rotor unit 10 also has a spin axis 16, which is the axis of rotation of rotor 12. Shaft 36 is also co-axial with rotor 12 along axis 16. Rotor unit 10 also has an X-reference axis 15 (FIG. 2) and a Y-reference axis 17, which are substantially at right angles to each other, and which are disposed in a plane substantially at right angles to axis 16.

Stator 14 has a base portion 38 on which shaft 36 is mounted. Shaft 36 has a supply passage 24, which is coupled to drive jets 20a, 20b and to braking jets 22a, 22b, 22c for flow therethrough. Passage 24 extends from shaft 36 through base 38 to a conduit fitting or pipe connection 40 at the edge of base 38.

Shaft 36 has an annular groove 42 disposed in the journaled outer surface of shaft 36. Shaft 36 also has conduits 44, 46 inter-connecting passage 24 and groove 42. Shaft 36 also has a conduit 48 connected to passage 24 with an opening in the journaled outer surface of shaft 36, which is axially spaced from groove 42.

Rotor 12, which is preferably in the shape of a disc, has a radially outer edge or surface 27 of cylindrical shape, and has a radially inner edge or bearing surface 35 also of cylindrical shape. Rotor 12 has a pair of axially spaced bearings 18, 19 connecting to surface 35 and to the outer surface of shaft 36.

Drive jets 20a, 20b, which extend between edge 27 and bearing surface 35, have respective outlet nozzles 30a, 30b, disposed in edge 27 adjacent their radially outer ends. Drive jets 20a, 20b, also have respective inlet ports 28a, 28b disposed in bearing surface 35 adjacent their radially inner ends. Inlet ports 28a, 28b are disposed in a plane including axes 15 and 17, and annular groove 42. Ports 28a, 28b are continuously coupled to groove 42 for supply of high-pressure gas from passage 24 to drive jets 20a, 20b. Nozzles 30a, 30b are arranged to point and discharge in a substantially tangential direction, their jet reactions having tangential force components causing counterclockwise rotation (FIG. 2) of rotor 12 for accelerating said rotor.

Braking jets 22a, 22b, 22c, which extend between outer surface 27 and bearing surface 35, have respective outlet nozzles 34a, 34b, 34c disposed in outer edge 27 adjacent their radially outer ends. Jets 22a, 22b, 22c also have inlet ports 32a, 32b, 32c respectively, which are disposed in bearing surface 35 adjacent their radially inner ends. Ports 32a, 32b, 32c are preferably disposed in a plane axially spaced from said plane through ports 28a, 28b. Ports 32a, 32b, 32c are intermittently coupled to conduit 48 for supply of high-pressure gas from passage 24 to jets 22a, 22b, 22c. Nozzles 34a, 34b, 34c are arranged to point and discharge in a substantially tangential direction, which is opposite to that of drive nozzles 30a, 30b. Braking nozzles 34a, 34b, 34c have jet reactions with tangential force components causing clockwise rotation (FIG. 3) of rotor 12 for decelerating said rotor. Thus, jets 22a, 22b, 22c can receive an in-flow or pressure pulse within a set angle of rotation of said jets relative to shaft 36; and can discharge their pressure pulse within a different angle counter-clockwise of said set angle (FIG. 3).

Braking jets 22a, 22b, 22c also have relief nozzles 33a, 33b, 33c respectively, disposed adjacent to said braking nozzles 34a, 34b, 34c. Relief nozzles 33a, 33b, 33c are arranged to point and discharge in a radial direction, and to provide only radial force components. Thus, said relief nozzles 33a, 33b, 33c, which do not have tangential force components, cannot rotate or torque rotor 12.

The nozzles in each set of braking and relief nozzles 33a, 34a and 33b, 34b and 33c, 34c are nearly equal in length to each other and equal to the nozzles in the other sets. Each set of nozzles also has the same fork-like connection to the radially inner portion of its respective jet 22a, 22b, 22c. Braking nozzles 34a, 34b, 34c and relief nozzles 33a, 33b, 33c also have a common peripheral travel path at their orifice ends alongside outer edge 27. Each braking nozzle 34a, 34b, 34c has a peripheral arc distance of separation from its adjacent relief nozzle 33a, 33b, 33c extending along outer edge 27 between the points of intersection of their respective axes with outer edge 27. The respective arc distances of said braking nozzles 34a, 34b, 34c are respectively equal to each other.

Plate 26, which preferably has the same shape as a ring segment, has a support arm 56 for supporting said plate from shaft 36. Arm 56 is integral with plate 26 at its radially outer end and is co-axially journaled on a portion of shaft 36 at its radially inner end. With this construction, plate 26 is rotatable about spin axis 16, for occasional slight adjustment and calibration of rotor unit 10 and for changing the speed level of rotor unit 10; and plate 26 is normally fixedly positioned by shaft 36 and supported therefrom for varying the discharges from said braking jet nozzles 34a, 34b, 34c in proportion to the speed of said rotor 12 for maintaining a substantially constant rotor speed, as explained hereafter in further detail.

Plate 26 has an arcuate face 50 on its radially inner side. Face 50 has a cylindrical surface which is concentric with the cylindrical surface of outer edge 27 about spin axis 16. Face 50 and outer edge 27 are separated by a gap 55, which preferably has a minimum size and thickness consistent with its manufacture to make plate 26 act more effectively in its control of the discharges from nozzles 34a, 34b, 34c and from nozzles 33a, 33b, 33c. Face 50 is disposed co-planar with the discharge path of nozzles 34a, 34b, 34c, and is operative to restrict outflow therefrom within a set angle of rotation of said rotor relative to shaft 36.

Plate 26 has edges 52, 54 defining the peripheral arc length of face 50. The aforementioned arc distances of the braking nozzles 34a, 34b, 34c, which are measured from their respective relief nozzles and which are equal to each other, are also nearly equal to the arc length of said face 50. With this construction, plate 26 can cover or overlie a portion of the orifice of the braking nozzle 34a or 34b or 34c and also cover a portion of the orifice of its relief nozzle 33a or 33b or 33c at the same time (FIGS. 3, 4). In this way, the braking torque or deceleration applied on rotor 12 in one revolution by braking nozzle 34a, or 34b or 34c (FIG. 3) depends on the unrestricted part of the orifice of said nozzle, when its pressure pulse is discharged. For example, the unrestricted part of the orifice of nozzle 34a can be defined as the distance between its edge 58 and the wall edge 54 (FIG. 4). The size of the opening or unrestricted part of said nozzles can be substantially controlled as explained hereafter thereby providing substantially constant rotor speed.

In operation, rotor 12 is rotated in a counter-clockwise direction by the reactions of high-pressure gas discharging from jets 20a, 20b (FIG. 2). Gas at substantially constant supply pressure, such as compressed air, is supplied to fitting 40, filling passage 24, conduits 44, 46 and groove 42. Said gas in groove 42 flows out through jets 20a, 20b at nozzle 30a, 30b for torquing rotor 12.

With a rotor of this type, there are relatively slight resisting torques, such as those caused by bearing frictions and the like. If braking jets 22a, 22b, 22c were inoperative, under the torquing by the drive jets 20a, 20b, rotor 12 would continue to accelerate when supplied in a normal manner with gas at a substantially constant pressure. Such rotor acceleration would continue until the peripheral speeds of nozzles 30a, 30b became substantially equal to the tangential or peripheral speeds of their discharges. Under such conditions, rotor 12 would acquire a ceiling speed, which would be variable and unpredictable.

Rotor unit 10 provides a range of constant speeds, which are below said ceiling speed. Rotor 12 is torqued in a clockwise direction and decelerated by the reactions of gas discharging from braking jets 22a, 22b, 22c (FIG. 3). To operate said jets, gas at a constant high pressure enters conduit 48 from passage 24. When conduit 48 is momentarily aligned in a radial direction with one of the inlets 32a, 32b, 32c, a charge enters jets 22a, or 22b or 22c, causing a pressure pulse to pass therethrough. A slight time interval is required for the pressure wave or pulse to travel from the inlet port 32a, or 32b or 32c to the respective nozzle outlet 33a, 34a or 33b or 33c, 34c of said jet. During this time interval, jet 22a, 22b or 22c will travel slightly counter-clockwise from its orientation when aligned with conduit 48. Such counter-clockwise travel closes or seals conduit 48 from inlet port 32a, 32b or 32c (FIG. 3). After such time interval, said pressure pulse or wave is discharged from the fork-like end of said jet. Such discharge from said jet 22a, 22b or 22c can leave from either or both of its nozzles.

In FIG. 3, to illustrate the operation of said braking jets, braking jet 22a is shown disconnected from conduit 48 and shown oriented slightly counter-clockwise of the axis of conduit 48. In this position, the pressure pulse would be moving radially outwardly and would be discharging from nozzle 33a and from nozzle 34a. In FIG. 3, edge 55 is shown partly overlapping nozzle 33a. In FIGS. 3, 4, edge 54 is shown overlapping nozzle 34a. In such a condition, only that portion of the pressure pulse discharging from nozzle 34a causes a decelerating torque on rotor 12. In this way, the rotor's speed regulates the travel of the nozzle 34a, 34b, 34c in a fixed time interval, which in turn regulates the opening width or size between sides 54 and 58 (FIG. 4) of nozzle 34a, which in turn regulates the decelerating torque on rotor 12. Thus, an increment to a substantially constant design speed causes a proportional increment to a substantially constant decelerating torque to counteract said speed increment and to maintain constant speed thereby providing a delicate speed control on the rotor.

Suitable calibration of rotor unit 10 is required to establish a set constant speed. For this purpose, plate 26 is properly oriented and positioned relative to shaft 36. In addition, the gas supply pressure is preferably held substantially constant, and the like.

At start-up condition, from which the rotor speed must rise from an initial start-up speed to a higher calibrated or design speed, relief nozzle 33a is fully open when a pulse reaches edge 27 and braking nozzle 34a is fully closed and there is not any decelerating torque applied on rotor 12. Upon reaching a calibrated speed, the partial restriction of braking nozzle 34a (FIG. 4) varies slightly with the fluctuation from said calibrated speed, increasing the braking nozzle discharge at a slight rotor overspeed and decreasing the nozzle discharge at a slight rotor underspeed. Thus, rotor 12 can maintain a particular constant set speed, which is determined initially by the particular orientation or position of plate 26. Moreover, rotor 12 can also maintain a range of succession of such constant speeds, which are determined initially by the progressive angular orientations or positions of plate 26 relative to shaft 36.

To further consider the operation of said braking jets, the above-mentioned time interval, which elapses while a pulse travels from inlet port 32a or 32b or 32c to either or both of its outlet nozzles 33a, 34a or 33b, 34b or 33c, 34c can be analyzed. Said time interval is mainly a function of the passage length between said points of inlet and outlet, and a function of the wave propagation speed of the particular gas used. Since these two physical quantities can be fixed, said time interval can be held substantially constant.

The above relations can also be expressed mathematically, as follows:

$$dt = Sp/Vp \qquad (1)$$

where:

$dt$ = time interval for pressure pulse to pass from inlet port 32a, 32b or 32c of braking jet 22a, 22b or 22c to its nozzle outlet 34a, 34b or 34c, $Sp$ = length of passage between said inlet port 32a, 32b or 32c and its respective nozzle outlet 34a, 34b, or 34c, and $Vp$ = average speed of said pressure pulse while en route between said inlet port and its respective nozzle outlet, and as follows:

$$dt = Sa/Va \qquad (2)$$

where:

$Sa$ = length of arc through which nozzle outlet 34a, 34b or 34c travels in a time interval $dt$, and $Va$ = peripheral speed of the braking jet nozzle outlet 34a, 34b or 34c or the rotor peripheral speed.

For a given time interval, the following relation exists:

$$dt = Sp/Vp = Sa/Va \qquad (3)$$

Thus, the nozzle arc length depends on the rotor speed:

$$Sa = Sp/Vp \times Va \qquad (4)$$

where the value of $Sp/Vp$ can be held constant.

Formula 4 indicates that rotor speed $Va$, which regulates the nozzle travel $Sa$ in a fixed time interval, regulates the nozzle opening (between orifice sides 54 and 58 as shown in FIG. 4 for nozzle 34a), which regulates the decelerating torque on rotor 12. Thus, an increment to a substantially constant design speed causes a proportional increment to a substantially constant decelerating torque to counteract said speed increment and to maintain constant speed thereby providing a delicate speed control of rotor 12.

In summary, a gas-driven rotor unit 10 according to this invention can stabilize and control the prescribed angular speed of its rotor within a very narrow range. Said rotor unit 10 can also be adjusted to provide other pre-selected angular speeds and can control each such speed within a similar narrow range.

Rotor unit 10 can also be easily combined with other types of speed control apparatus, such as types described in U.S. Patent Nos. 3,055,635 and 3,055,636, which are assigned to the same assignee as this application, whereby the prescribed speed or a rotor unit can be controlled to a still finer degree.

While the present invention has been described in detail in its present preferred embodiment, it will be obvious to those skilled in the art after understanding this invention that various changes and modifications may be made therein without departing from the spirit or scope thereof. For example, an air-bearing film can be substituted for bearings 18, 19 to minimize friction; or seal rings can be added alongside bearings 18, 19 to minimize leakage. Another example is that a plurality of equi-spaced plate members with respective feed conduits may be provided, which are similar in construction to plate 26 with its conduit 48. It is intended by the appended claims to cover all such modifications.

What is claimed is:

1. A gas-driven rotor unit comprising:
   a rotor co-axially mounted upon a support for rotation relative thereto;
   said rotor having a plurality of drive jets with radially outer nozzle portions pointed and discharging in a substantially tangential direction for torquing and accelerating said rotor,
   said rotor having a plurality of braking jets with radially outer nozzle portions pointed and discharging in a tangential direction generally opposite to said drive jets for counter-torquing and decelerating said rotor,
   said support having flow control means supported therefrom for varying the discharges from said braking jet nozzles in proportion to the speed of said rotor for maintaining a substantially constant rotor speed.

2. A rotor unit as claimed in claim 1, in which:
   said support for the rotor is a shaft journaled in the rotor,
   said shaft having a supply passage,
   said shaft having a first coupling means connecting said passage to the drive jets for flow therethrough, and
   said shaft having a second coupling means connecting said passage to each of said braking jets for flow therethrough within a set intake angle of orientation of each braking jet relative to said shaft.

3. A rotor unit as claimed in claim 2, in which said flow control means includes:
   a plate connected to said support having an arcuate face on its radially inner side and being disposed substantially coplanar with the discharge path of said braking nozzles and being operative to restrict outflow from said braking nozzles within a different angle displaced from said set intake angle of orientation of said braking jets, and
   said braking jets respectively having relief nozzles with portions arranged to point and discharge in a radial direction for avoiding torquing of the rotor.

4. A rotor unit as claimed in claim 3, in which the discharge ends of said relief nozzles have the same travel path as the corresponding discharge ends of said braking nozzles.

5. A rotor unit as claimed in claim 3, in which said braking nozzles are separated peripherally from their respective relief nozzles by respective arcuate distances, said arcuate distances being equal to each other and substantially equal to the arcuate length of said plate face.

6. A rotor unit as claimed in claim 3, in which said plate is rotatably adjustable relative to said shaft for changing said substantially-constant rotor speed level.

7. A rotor unit as claimed in claim 3, in which said first coupling means includes an annular groove disposed in the journaled surface of said shaft and in communication with said supply passage, and includes inlet ports disposed in the journaled surface of said rotor and coplanar with said annular groove with each said inlet port communicating with a drive jet for continuous flow through each said drive jet.

8. A rotor unit as claimed in claim 3, in which said second coupling means includes an outlet opening disposed in the journaled surface of said shaft and in communication with said supply passage, and includes inlet ports disposed in the journaled surface of said rotor and coplanar with said outlet opening with each said inlet port communicating with a braking jet for intermittent flow through each said braking jet.

9. A rotor unit as claimed in claim 3, in which said rotor has a blind bearing portion journaled on said shaft, the journaled surfaces of said shaft and said bearing forming a gap therebetween and said shaft having a feed passage connecting said gap to said supply passage thereby providing a gas film in said gap for use as an air bearing between said rotor and said shaft.

10. A rotor unit as claimed in claim 3, in which each braking nozzle has a passage with nearly the same length as the passage of its adjacent relief nozzle.

11. A rotor unit as claimed in claim 3, in which the braking jets have the same length passages, each such passage having a length equal to:

$$Sp = Vp \times Sa/Va$$

where:

$Sp$ = length of passage of braking jet from its inlet to its nozzle outlet,
$Vp$ = average speed of gas pressure pulse during travel through braking jet passage,
$Sa$ = length of arc through which braking jet nozzle outlet moves while pulse is traveling through braking jet passage,
$Va$ = peripheral velocity of the rotor adjacent said braking jet nozzle outlet.

12. In a gyroscope having a spin axis about which a rotor rotates and having an output axis about which an inner gimbal can be pivoted and having an input axis about which an outer gimbal can be pivoted with said three axes being in quadrature, a rotor unit comprising:

a shaft which can be fixed to said inner gimbal co-axial with said spin axis and having a fluid supply passage, a rotor journaled on said shaft for rotation relative thereto, having a first portion with a first radial passage connected to the shaft supply passage and with a first outlet nozzle at its radially outer end pointed in a substantially tangential direction for discharging fluid with a force component for rotating the rotor, and having a second portion with a second radial passage connected to the shaft supply passage and with a second outlet nozzle at its radially outer end pointing oppositely to said first nozzle for discharging fluid with a force component for restraining rotation of the rotor, and flow-regulating means adjustably mounted on said shaft cooperating with said second outlet nozzle for varying its fluid discharge in proportion to said rotation of said rotor relative to said shaft for maintaining a substantially constant rotor speed.

References Cited by the Examiner

UNITED STATES PATENTS

| | | | |
|---|---|---|---|
| 2,729,106 | 1/1956 | Mathiesen | 74—5.7 |
| 2,743,576 | 5/1956 | Crockett | 74—5.7 X |
| 3,115,784 | 12/1963 | Parker | 74—5.12 |

BROUGHTON G. DURHAM, *Primary Examiner.*

T. W. SHEAR, *Assistant Examiner.*